(12) United States Patent
Mace et al.

(10) Patent No.: US 12,373,554 B2
(45) Date of Patent: Jul. 29, 2025

(54) GENERATING SECURITY LANGUAGE QUERIES

(71) Applicant: Microsoft Technology Licensing, LLC, Redmond, WA (US)

(72) Inventors: Daniel Lee Mace, Bellevue, WA (US); William Blum, Bellevue, WA (US); Jeremias Eichelbaum, Vancouver (CA); Amir Rubin, Vancouver (CA); Edir V. Garcia Lazo, Seattle, WA (US); Nihal Irmak Pakis, Vancouver (CA); Yogesh K. Roy, Redmond, WA (US); Jugal Parikh, Sammamish, WA (US); Peter A. Bryan, Seattle, WA (US); Benjamin Elliott Nick, Bellevue, WA (US); Ram Shankar Siva Kumar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 17/900,394

(22) Filed: Aug. 31, 2022

(65) Prior Publication Data
US 2024/0070270 A1 Feb. 29, 2024

(51) Int. Cl.
*G06F 40/47* (2020.01)
*G06F 16/242* (2019.01)
*G06F 21/55* (2013.01)

(52) U.S. Cl.
CPC ........ *G06F 21/554* (2013.01); *G06F 16/2423* (2019.01); *G06F 40/47* (2020.01)

(58) Field of Classification Search
CPC .... G06F 21/554; G06F 16/2423; G06F 40/47; G06F 21/566; G06F 21/552
See application file for complete search history.

(56) References Cited

U.S. PATENT DOCUMENTS

| | | | |
|---|---|---|---|
| 11,893,341 B2 * | 2/2024 | Itani | G06F 16/2428 |
| 2019/0132214 A1 * | 5/2019 | Porras | H04L 41/147 |

(Continued)

OTHER PUBLICATIONS

Brown, et al., "Language Models are Few-Shot Learners", In Repository of arXiv:2005.14165v4, Jul. 22, 2020, pp. 1-75.

(Continued)

*Primary Examiner* — Lynn D Feild
*Assistant Examiner* — Vladimir I Gavrilenko
(74) *Attorney, Agent, or Firm* — Schwegman Lundberg & Woessner, P.A.

(57) ABSTRACT

A computer-implemented method of generating a security language query from a user input query includes receiving, at a computer system, an input security hunting user query indicating a user intention; selecting, using a trained machine learning model and based on the input security hunting query, an example user security hunting query and corresponding example security language query; generating, using the trained machine learning model, query metadata from the input security hunting query; generating a prompt, the prompt comprising: the input security hunting user query; the selected example user security hunting query and the corresponding example security language query; and the generated query metadata; inputting the prompt to a large language model; receiving a security language query from the large language model corresponding to the input security hunting query reflective of the user intention.

20 Claims, 15 Drawing Sheets

(56) References Cited

U.S. PATENT DOCUMENTS

| | | | | |
|---|---|---|---|---|
| 2020/0341976 | A1* | 10/2020 | Aggarwal | G06F 16/90332 |
| 2020/0412767 | A1* | 12/2020 | Crabtree | H04L 63/1441 |
| 2023/0083512 | A1* | 3/2023 | Newman | G06N 3/045 |
| | | | | 704/9 |
| 2023/0315856 | A1* | 10/2023 | Lee | G06F 40/30 |
| 2023/0418815 | A1* | 12/2023 | Zorn | G06F 40/18 |
| 2024/0037327 | A1* | 2/2024 | Kallepalli | G06F 40/211 |
| 2024/0095447 | A1* | 3/2024 | Ping | G10L 13/02 |

OTHER PUBLICATIONS

International Search Report and Written Opinion received for PCT Application No. PCT/US2023/028905, Dec. 15, 2023, 19 pages.

Prashant, "Create a Question-Answer Service using GPT-3 and OpenAI", Retrieved from: https://medium.com/geekculture/create-a-question-answer-service-using-gpt-3-and-openai-41498c73879b, Jan. 23, 2022, 17 Pages.

"GPT-3", Retrieved from: https://en.wikipedia.org/wiki/GPT-3#:~:text=Generative%20Pre-trained%20Transformer%203%20%28GPT-3%29%20is%20an%20autoregressive,OpenAI%2C%20a%20San%20Francisco-based%20artificial%20intelligence%20research%20laboratory, Sep. 8, 2022, 9 Pages.

"GPT-3 for Next Generation", Retrieved from: https://blog.intelgic.com/gpt-3-for-next-generation/, Aug. 13, 2021, 5 Pages.

"Multi-Label Text Classification with BERT and PyTorch Lightning", Retrieved from: https://curiousily.com/posts/multi-label-text-classification-with-bert-and-pytorch-lightning/, Apr. 26, 2021, 34 Pages.

"Nlpaug 1.1.11", Retrieved from: https://pypi.org/project/nlpaug/, Jul. 7, 2022, 9 Pages.

"Question and Answering System Using GPT3", Retrieved from: https://www.pragnakalp.com/question-answering-using-gpt3-examples/, May 31, 2021, 10 Pages.

"Question Answering with GPT-3", Retrieved from: https://www.thecriticalcoder.com/question-answering-with-gpt-3/, Retrieved on: Sep. 20, 2022, 12 Pages.

Alberti, et al., "Synthetic QA Corpora Generation with Roundtrip Consistency", In Proceedings of the 57th Annual Meeting of the Association for Computational Linguistics, Jul. 28, 2019, pp. 6168-6173.

Bell, et al., "SQL to Kusto Cheat Sheet", Retrieved from: https://learn.microsoft.com/en-us/azure/data-explorer/kusto/query/sqlcheatsheet, Jul. 26, 2022, 3 Pages.

Copeland, Marshall, "Kusto Query Language and Threat Hunting", In Proceedings of Cloud Defense Strategies with Azure Sentinel, Oct. 2, 2021, pp. 185-211.

Cruz, et al., "Learn the Advanced Hunting Query Language", Retrieved from: https://learn.microsoft.com/en-us/microsoft-365/security/defender/advanced-hunting-query-language?view=o365-worldwide, Aug. 31, 2022, 8 Pages.

Droste, Benedikt, "Multilabel Classification With PyTorch in 5 Minutes", Retrieved from: https://towardsdatascience.com/multilabel-classification-with-pytorch-in-5-minutes-a4fa8993cbc7, Jan. 13, 2022, 12 Pages.

Hendler, et al., "AMSI-Based Detection of Malicious PowerShell Code Using Contextual Embeddings", In Repository of arXiv:1905.09538v2, Sep. 19, 2019, 17 Pages.

Kane, Brian, "Automating my Job by using GPT-3 to Generate Database-Ready SQL to Answer Business Questions", Retrieved from: https://web.archive.org/web/20220117162642/https://blog.seekwell.io/gpt3, Jan. 17, 2022, 14 Pages.

Lu, et al., "Fantastically Ordered Prompts and Where to Find Them: Overcoming Few-Shot Prompt Order Sensitivity", In Repository of arXiv:2104.08786v2, Mar. 3, 2022, 13 Pages.

Ma, et al., "Nlpaug", Retrieved from: https://github.com/makcedward/nlpaug, Jul. 7, 2022, 11 Pages.

Mishra, Prakhar, "Training Question Answering Models from Synthetic Data (Research Paper Summary)", Retrieved from: https://towardsdatascience.com/training-question-answering-models-from-synthetic-data-research-paper-summary-2220186703f, May 28, 2021, 16 Pages.

Mukherjee, Rajshekhar, "Gpt-3-NLP-to-SQL", Retrieved from: https://github.com/rajshekharM/gpt-3-NLP-to-SQL, Jul. 30, 2020, 2 Pages.

Sagir, et al., "Kusto Query Language (KQL) Overview", Retrieved from: https://learn.microsoft.com/en-us/azure/data-explorer/kusto/query/, Mar. 7, 2022, 3 Pages.

Souza, Tiago, "KQL Overview—Kusto Query Language", Retrieved from: https://cybergeeks.cloud/2021/07/overview-kql-kusto-query-language/, Sep. 20, 2021, 10 Pages.

Zaremba, et al., "OpenAI Codex", Retrieved from: https://openai.com/blog/openai-codex/, Aug. 10, 2021, 4 Pages.

Kha, Huy, "Kusto Query Internals: Hunting TTPs with Azure Sentinel", Retrieved From: https://identityandsecuritydotcom.files.wordpress.com/2020/05/kql_internals_sentinel.pdf, May 9, 2020, 86 Pages.

Ouyang, et al., "Training Language Models to Follow Instructions with Human Feedback", In Repository of arXiv:2203.02155v1, Mar. 4, 2022, 68 Pages.

"Invitation to Pay Additional Fees Issued in PCT Application No. PCT/US23/028905", Mailed Date: Oct. 24, 2023, 13 Pages.

Rony, et al., "SGPT: A Generative Approach for SPARQL Query Generation From Natural Language Questions", In Journal of IEEE Access, vol. 10, Jul. 11, 2022, pp. 70712-70723.

Shrivastava, et al., "Repository-Level Prompt Generation for Large Language Models of Code", In Repository of arXiv:2206.12839v1, Jun. 26, 2022, 18 Pages.

* cited by examiner

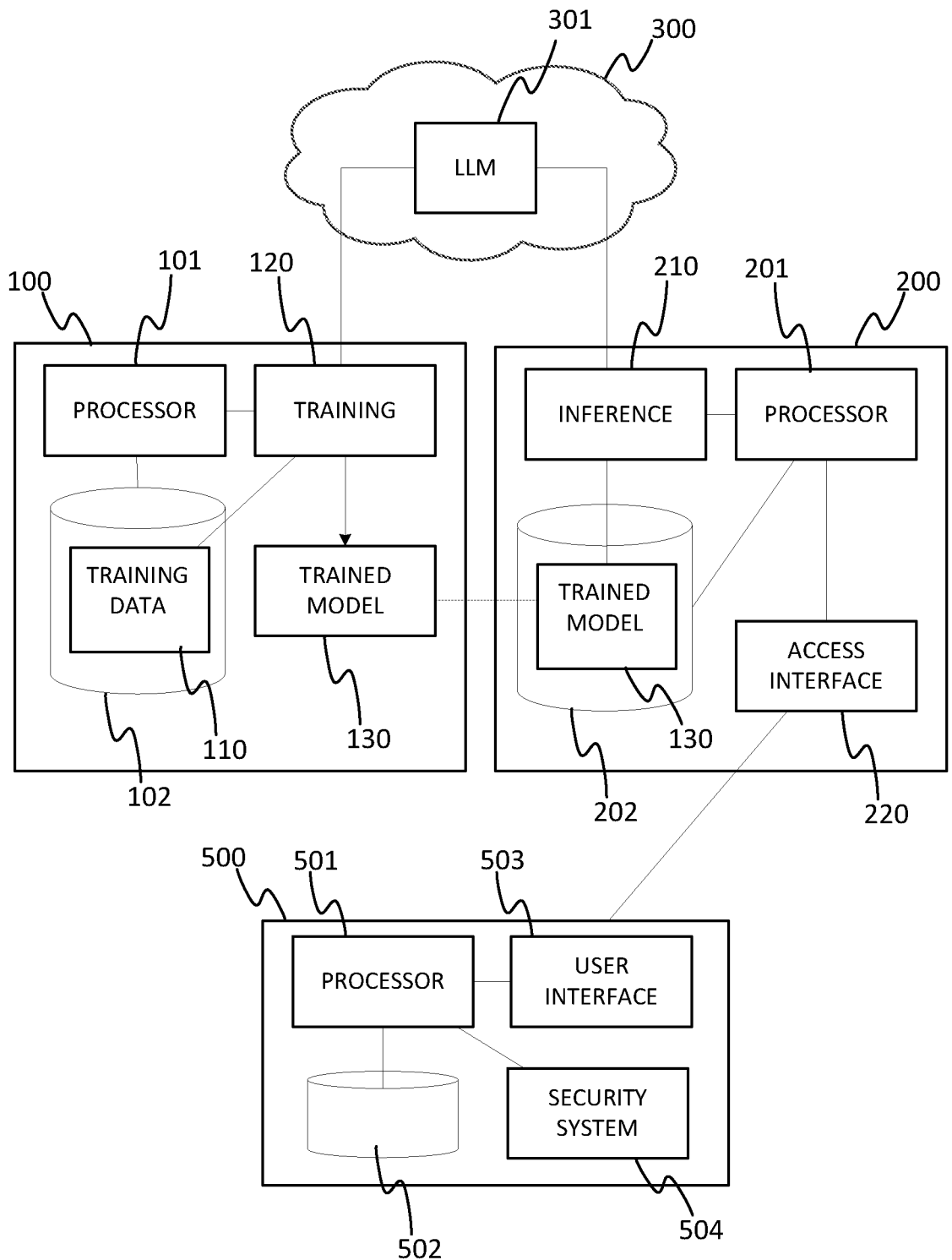

| Content | Label |
|---|---|
| Given an input star trek computer-like question (ASK), return an output Kusto Query Language (KQL) query as if it were written by a Security Analyst for Azure Sentinel...... | Preamble 401 |
| The following table/columns are relevant to the final query (KQL):<br>Kusto tabular data imAuthentication, kusto columns [ EventResult, SrcDvcIpAddr, IPAddress, EventVendor, EventResultDetails, EventType, EventProduct, TargetUserName, Location, TargetAppName, Dvc ] | Table Schema 402 |
| ####<br>ASK:<br>I want to know all logins that resemble a password spray attack by failing to log into more than fifteen different users within 5 minutes;<br>The query uses statements from tables ( imAuthentication );<br>KQL:<br>let FailureThreshold = 15;<br>imAuthentication<br>\| where EventType== \"Logon\" and EventResult== \"Failure\"<br>\| where EventResultDetails in (\"No such user or password\", \ "Incorrect password\")<br>\| summarize UserCount=dcount(TargetUserId), Vendors=make_set(EventVendor), Products=make_set(EventVendor), Users = make_set(TargetUserId,100) by SrcDvcIpAddr, SrcGeoCountry, bin(TimeGenerated, 5m)<br>\| where UserCount > FailureThreshold<br>####<br>ASK:<br>Find all users that have logged into more than 3 hosts in the last two days;<br>The query uses statements from tables ( imAuthentication );<br>KQL:<br>imAuthentication<br>\| where TimeGenerated > ago(2d)<br>\| where EventResult =~ \"Success\"<br>\| where isnotempty(Dvc) and Dvc != \"Microsoft\"<br>\| summarize dcount(Dvc) by User<br>\| where dcount_Dvc > 3<br>#### | Shots 403 |
| ASK:<br>get the count of users who have logged in yesterday; | Pcompletion 404 |
| The query uses statements from tables ( imAuthentication ); | Table Intent 405 |

Figure 6

I want to know all logins that have come from different countries within the last 3 hours

502

Which Office operations were performed by accounts that are not typically used by administrators Find all accounts that have been added to a privileged PIM group Show me external user accounts that are added to a team and then removed within one hour Return the top 100 IP addresses by device name that have not been seen in the last 10 minutes Get all the destination email addresses used in mailbox forwarding rules created

| 1 | 2 | 3 | 4 | 5 | 6 | Distance |
|---|---|---|---|---|---|----------|
| 1 | 0 | 1 | 0 | 1 | 0 | 1025.6 |
| 0 | 1 | 0 | 1 | 1 | 0 | 516.2 |
| 0 | 1 | 0 | 1 | 0 | 1 | 215.1 |
| 1 | 0 | 1 | 0 | 0 | 1 | 491.5 |

Validation: Find all failed logins from outside the US in the past day

501

GENERATING SECURITY LANGUAGE QUERIES

BACKGROUND

Security hunting or threat hunting involves proactively searching for security threats to a computer system. One challenge for security analysts is understanding the structure and format of security data, in order to be effective when performing a security investigation. On average, companies use 20 different security products to protect and defend their assets and intellectual property. Most of these security products use their own proprietary log structure, which is difficult to decipher and understand, and requires a considerable amount of time for an analyst to become proficient in interrogating. Microsoft® security products (e.g. Microsoft® Sentinel®/Defender®) employ a query language called Kusto Query Language (KQL) for querying these logs, which is often unfamiliar for junior analysts with limited knowledge of the relevant table and schema definitions.

SUMMARY

According to one aspect disclosed herein, there is provided a computer-implemented method comprising: receiving an input security hunting user query; selecting, using a trained machine learning model and based on the input security hunting query, an example user security hunting query and corresponding example security language query; generating, using the trained machine learning model, query metadata from the input security hunting query; generating a prompt, the prompt comprising: the input security hunting user query; the selected example user security hunting query and the corresponding example security language query; and the generated query metadata; inputting the prompt to a large language model; receiving a security language query from the large language model corresponding to the input security hunting query.

Using a trained machine learning model to select the examples (or "shots") included in the prompt and to generate appropriate metadata (e.g. table schema data) assists in providing reliable security language queries that closely align to the users intent.

According to another aspect disclosed herein, there is provided a computer-implemented method comprising: receiving a training data set comprising a plurality of user security hunting queries, corresponding ground truth security language queries and corresponding query metadata; generating a plurality of probe prompts from the training data set, wherein generating each probe prompt comprises: selecting one of the plurality of user security hunting queries as a subject of the probe prompt; randomly selecting a plurality of the user security hunting queries and corresponding ground truth security language queries to as examples of the probe prompt; inputting the generated probe prompts to a large language model; receiving as output from the large language model, a security language query corresponding to the subject of each probe prompt; comparing the received security language query for the probe prompt to the corresponding ground truth security language query; calculating a probe score for each probe prompt based on the comparison; training a machine learning model based on the calculated probe scores and the training data set, the machine learning model being trained to: receive an input user security hunting query; generate output scores reflective of a utility of each user security hunting query and corresponding ground truth security language query of the training data set to the input user security hunting query; and select a user security hunting query and corresponding ground truth security language query of the training data set as an example of a prompt for input to the large language model based on the output scores; and generate query metadata for the prompt to the large language model from the input security hunting user query.

The generation of plural probe prompts is an efficient method of assessing the impact of including particular shots in prompts, which may otherwise be opaque given the nature of large language models. This probing enables the training of a model to select the shots for inclusion in a prompt.

According to another aspect disclosed, there is provided a system comprising a processor and storage, the storage comprising computer-readable instructions which when executed cause the system to carry out any of the methods discussed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 1 is a schematic block diagram of an environment in which examples of the disclosure operate;

FIG. 2 is a schematic diagram of an example prompt for submission to a large language model to generate a security language query;

FIG. 6 is a diagram illustrating probe scores generated using the probing technique of FIG. 5;

DETAILED DESCRIPTION OF EMBODIMENTS

Figure 3:
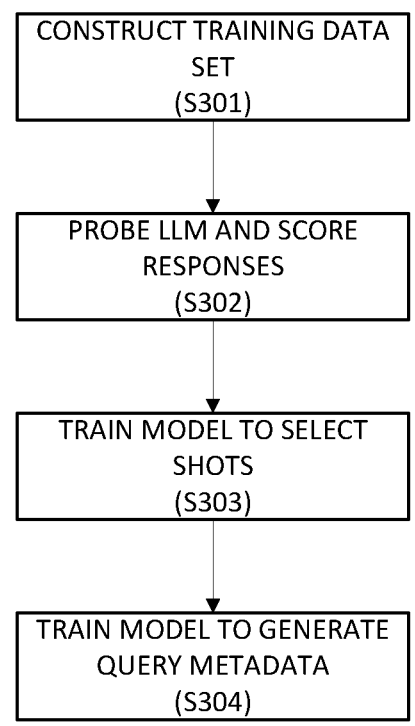
FIG. 3 is a flow chart of a method of training a machine learning model to select shots and generate query metadata.

In overview, examples of the disclosure relate to generating a query in a security query language (i.e. a structured, code-like language such as KQL) from unstructured user input, for example in the form of natural language query.

Recently, Large Language Models (LLMs) employing a transformer architecture have been developed. Such LLMs are trained on a very large quantity of data, comprising a wide variety of diverse datasets. For example, GPT-3 (Generative Pre-trained Transformer 3) developed by Open AI® has 175 billion parameters and was trained on 499 billion tokens. BERT (Bidirectional Encoder Representations from Transformers), developed by Google®, is an example of another LLM.

The diverse training and large size of LLMs has led to some emerging properties and characteristics that were not possible with previous models. One of these aspects is the concept of using natural language prompts to ask the LLM to solve a task in a general way. These often fall into the category of zero-shot, one-shot or few-shot learning, with the "shots" being the number of labelled examples provided to the LLM as part of the natural language prompt.

Accordingly, the disclosure relates to generating a prompt for an LLM, the prompt including one or more examples (or "shots") and additional query metadata (e.g. table schemas and an indication of relevant tables). The shots and query metadata are generated by a trained machine learning model. The resulting prompt can then be passed to the LLM, which returns a corresponding security query language query. In some examples, multiple prompts are generated and passed to the LLM, and a selection is made from the resulting security language queries. The use of the trained machine learning model to select the shots and query metadata results in accurate security language queries closely corresponding to the intent of the original user input.

In one example, the machine learning model that generates the shots (i.e. the "one shot" or "few-shots") for the prompt is trained using a probing procedure, in which probe prompts are generated from a training set. The probe prompts include various permutations of example shots, which are passed to the LLM. The outcome of each probe prompt is compared to a known ground truth to generate a score. The model is then trained to select an example shot, or in the examples where multiple shots are used, select multiple shots. For example, the model can be trained to rank the example shots and select shots for inclusion in a prompt accordingly. The query metadata is also learned from the training set.

LLMs provide general application programming interfaces (APIs) for performing tasks including completion (i.e. completing a prompt to provide an answer such as the security language query). The APIs and to some extent the LLMs are black boxes, and it can be difficult to ascertain why the LLM returns the results it does, making it difficult to reliably curate prompts to return results in a predictable and expected way. The use of the probing procedure results in a trained machine learning model that takes into account the characteristics of the LLM.

FIG. 1 illustrates an example environment 1 in which examples of the disclosure operate, to provide an overview of components of the disclosure.

The environment 1 includes a large language model (LLM) 301. The LLM 301 is a trained language model, based on the transformer deep learning network. The LLM 301 is trained on a very large corpus (e.g. in the order of billions of tokens), and is a generative model that can generate text or data in response to receipt of a prompt. Particularly, the LLM 301 is able to generate code in response to a prompt. "Code" in this context includes query languages.

An example of a suitable LLM 301 is the Open AI Codex model (https://openai.com/blog/openai-codex/). The Codex model is a version of the GPT-3 model, fine-tuned for use in code generation. However, a variety of LLMs 301 may be employed in the alternative, which may or may not be specifically tuned for code generation. The techniques discussed herein effectively learn the characteristics of the underlying LLM 301, and thus are particularly apt for use with different LLMs 301.

The LLM 301 operates in a suitable computer system 300. For example, the LLM 301 is stored in a suitable data centre, and/or as part of a cloud computing environment or other distributed environment. The LLM 301 is accessible via suitable APIs, for example over a network connection.

The environment 1 includes a system 100 configured to train a machine learning model 130 to generate elements for inclusion in a prompt for input to the LLM 301. The prompt includes a user query, discussed in more detail below, which is converted to a query in a security language by the LLM 301. For convenience, throughout the disclosure reference is made to KQL queries, as an example of a queries in a security language. However, KQL is merely an example of a suitable security language.

The system 100 includes a processor 101 and storage 102. The processor 101 is configured to execute instructions stored in the storage 102 in order to carry out the training methods discussed herein. The storage 102 also stores a training data set 110. The training operations of the system 100 are represented by training module 120, which will be discussed in more detail below.

The system 100 for training the machine learning model 130 comprises any suitable computer system. In one example, the system 100 may be a suitable high-performance computer or computer cluster. In other examples, the system 100 may be a server computer, for example located in a data centre. Equally, the system 100 may be a desktop or laptop computer or the like.

The environment 1 further includes a system 200 configured to generate a prompt for the LLM 301 using the trained model 130. In other words, the system 200 carries out the inference time activities discussed herein. The system 200 may also submit the prompt to the LLM 301 to generate corresponding KQL. By corresponding, it is meant that the KQL is reflective of the intention of the user inputting the query. In other words, the KQL, when executed, would return results responsive to the user's input query.

The system 200 includes a processor 201 and storage 202. The processor 201 is configured to execute instructions stored in the storage 202 in order to carry out the inference methods discussed herein. The storage 202 also stores the trained model 130. The inference operations of the system 200 are represented by inference module 210, and will be discussed in more detail below.

The system 200 also includes a access interface 220. In one example, the access interface 220 may take the form of a suitable API, for receiving the user query from a user device (500, discussed below), and returning the corresponding KQL. In another example, the access interface 220 is a web interface, configured to serve web pages via which a user may input a user query and receive the corresponding KQL.

The environment further includes a system 500, which is a user system operated by an end user. The system 500 includes a processor 501 and storage 502. The system 500 has a user interface 503, which is configured to receive user input and display data to the user. The system 500 also includes a security system 504, which is configured to receive and execute a KQL query. For example, the security system 504 may comprise Microsoft® Defender® or Sentinel®. The user may interact with system 500 via the user interface 503, to input a user query. In some examples, the system 500 displays the corresponding KQL on the user interface 503. In some examples, the system 500 executes the corresponding KQL using the security system 504.

In some examples, the systems 100 and 200 are the same system. That is to say, the same system may be used to train the model and for inference. In some examples, the system 200 and 500 are the same system, such that the system carrying out the inference is the same system including the security system 504 and receiving user input.

FIG. 2 illustrates an example prompt 400 submitted to the LLM 301 to generate a security query in the examples herein.

The prompt 400 includes a preamble 401, which generally outlines the task required to the LLM 301. The preamble 401 indicates that the LLM 301 should generate a KQL query based on an input query (ASK).

In one example, the preamble 401 is static. That is to say, it may be predetermined, rather than being generated dynamically. In other examples, the preamble 401 is dynamically generated—for example some variability may be introduced to the preamble 401 by selecting it (or elements of it) from a plurality of predetermined options, for example by random chance or according to some other distribution.

The prompt 400 also includes table schema data 402. This is an example of query metadata, which is information derived from the input query. The query metadata is extra information acting as a hint or pointer to the LLM 301 as to the KQL query to be generated. In the example of FIG. 2, the table schema data 402 lists a particular table (imAuthentication) and particular columns (EventResult, SrcDvclpAddr, etc) that are relevant to the KQL query to be generated.

The prompt 400 also includes shots 403, which are example input queries and corresponding KQL queries. In the example shown, the prompt includes two shots 403, the shots 403 being separated by a line of hash symbols acting as a separator.

The prompt 400 further includes the input query 404, for which the corresponding KQL query is sought.

Finally, the prompt 400 includes table intent data 405, which is another example of query metadata. The table intent data 405 states which tables the resulting KQL query should use.

The shots 403 and the query metadata 402, 405 are generated dynamically by the system 200 using the trained model 130.

The prompt 400 shown in FIG. 2 is merely an example of the structure of a suitable prompt to assist understanding of the example systems and methods discussed herein. The arrangement of the elements of the prompt 400 and the number of shots 403 included may vary.

Furthermore, other types of query metadata may be included in the prompt 400. In some examples, the query metadata includes an indication of the length or complexity of the resulting KQL query. For example, the query metadata may include a statement indicating that the resultant query is likely to be short (e.g. under a certain number of lines) or long (e.g. over a certain number of lines). The query metadata may given an indication of the types of statements to be included in the KQL query (e.g. that the query should include a join statement).

FIG. 3 illustrates a process of training a model to generate elements of a prompt for the the LLM 301 in overview. The process may be carried out by the training system 100.

In step S301, the process includes forming a training data set for training the model 130.

The training data set can include manually labelled training data and/or synthetically generated examples.

In step S302, the process includes probing the LLM 301 with probe prompts generated from the training data. The probe prompts include shots selected from the training data. By assessing the response of the LLM 301 to different probe prompts including different selections of shots, a ranking of the usefulness of the shots is obtained.

In step S303, the process includes training the model 130 to select shots for inclusion in a prompt using the ranking obtained in step S202.

In step S304, the process includes training the model 130 to generate query metadata for inclusion in a prompt using the training data.

The process results in the trained model 130, which is configured to generate shots and query metadata for a prompt for submission to the LLM 301.

Figure 4:
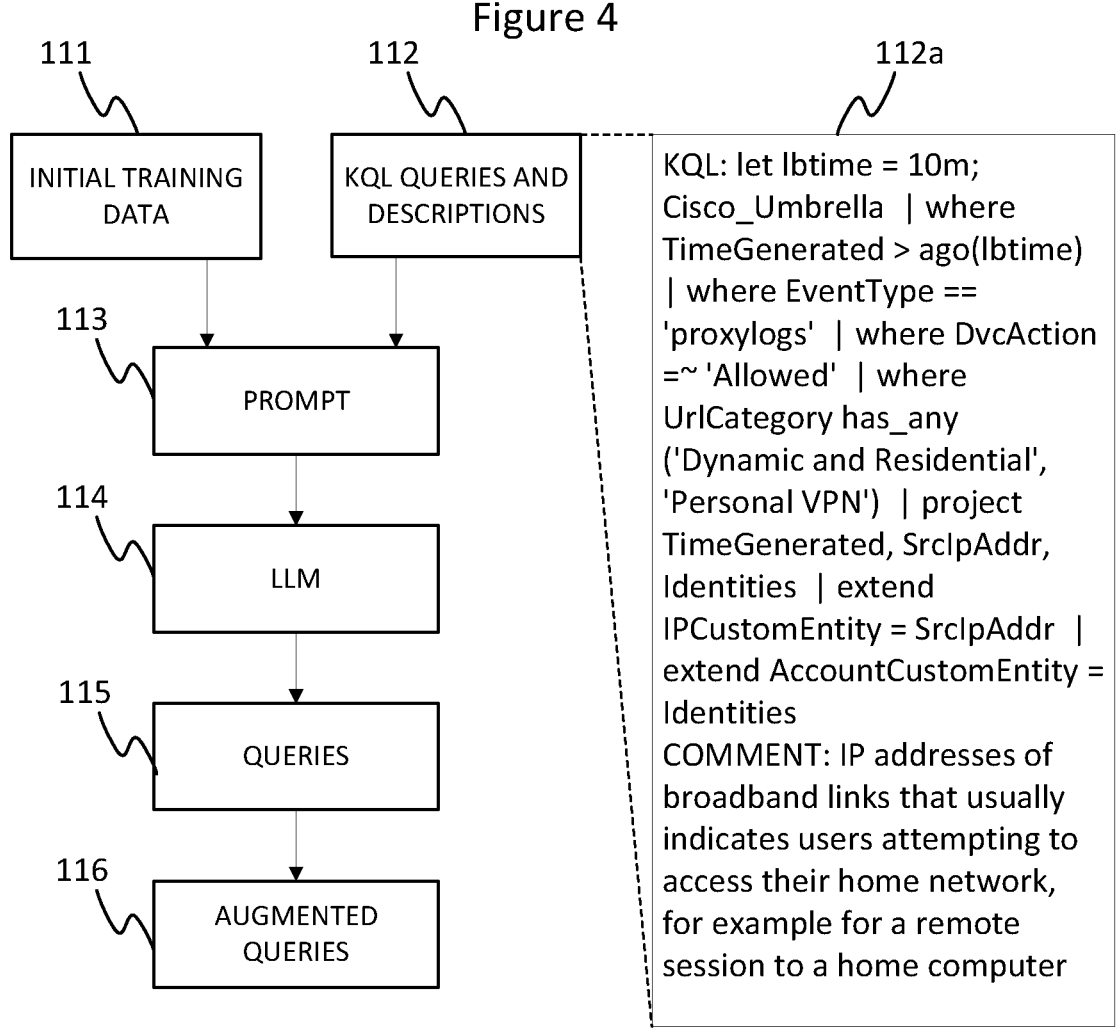
FIG. 4 is a schematic block diagram illustrating a technique for forming a training data set.

FIG. 4 illustrates an example process of forming the training data set 110 in more detail.

The system 100 is provided with an initial training data set 111 is received. The initial training data set 111 comprises example prompts similar to the prompt illustrated in FIG. 2, which are ground truth examples of prompts for a particular input query.

The system 100 also is provided with a set of KQL queries 112, each query having a corresponding description. The description explains the purpose of the corresponding KQL query. An example KQL query and description 112a is shown in FIG. 4.

In one example, the KQL queries and descriptions are manually created. For example, they may be harvested from suitable manually training materials, code examples and the like, wherein the descriptions are comments in the code. In other examples, the KQL queries and description may be synthetically generated, for example by using roundtrip filtration technique similar to that discussed in Chris Alberti, Daniel Andor, Emily Pitler, Jacob Devlin, and Michael Collins. 2019. Synthetic QA Corpora Generation with Roundtrip Consistency. In Proceedings of the 57th Annual Meeting of the Association for Computational Linguistics, pages 6168-6173, Florence, Italy. Association for Computational Linguistics.

The initial training set 111 and KQL query set 112 are used to generate example user queries corresponding to the KQL queries in the query set 112. Particularly, examples from the initial training set 111 are used as shots in a prompt 113 for generating the corresponding user query.

Once generated, each prompt 113 is supplied to a LLM 114. In one example, the LLM 114 is not the same LLM as LLM 301 used for generating the KQL queries. Instead, the LLM 114 is an LLM intended for natural language generation, such as the Davinci GPT-3 model provided by OpenAI. The LLM 114 accordingly returns synthetic user queries 115 corresponding to the KQL queries in the KQL query set 112.

This approach allows a relatively small initial training data set 111 including user queries and corresponding KQL queries to be expanded using a larger labelled data set of KQL queries 112 accompanied by textual descriptions.

In addition, by varying the shots included in the prompts 113, a plurality of different-styled user queries that can be generated that correspond to the same underlying KQL. This is on the basis that the LLM 114 will respond with different variations (e.g. different syntactic structure or writing style) of the user queries dependent on the shots included in the prompt. The result of this part of the process is a corpus comprising KQL queries, descriptions and corresponding user queries.

In order to further expand the training data, the synthetic queries are then augmented. In other words, natural language processing techniques or tools are used to generate further queries that substantially correspond in meaning to the queries 115.

In one example, the user queries are backtranslated to generate new queries. Backtranslation is the process of translating the query from English into a different language and back again, using suitable trained machine translation models. The result of the backtranslation can simply be taken as a new query, or the result can be combined with the original query to expand the query. The queries can be backtranslated via a variety of different languages to generate more queries.

The backtranslated and original queries 115 are augmented to generate augmented queries 116 by replacing one or more words of the queries with synonyms using thesauruses or word embedding models, or by inserting words in the queries based on suitable word embedding models. An example library suitable for carrying out this data augmentation is the NLP Augmentation library (Edward Ma, see https://github.com/makecedward/nlpaug).

This results in a relatively large corpus 110 of example natural language queries, each corresponding to a KQL query. In one example, an initial training data set 111 of 62 examples and approximately 1200 KQL queries 112 were used to generate 219 synthetic questions, each phrased in 6 different ways for a total of 1314 natural language queries. Backtranslation expanded the total natural language queries to 9200, and applying the augmentation resulted in 28300 user queries.

Figure 5:
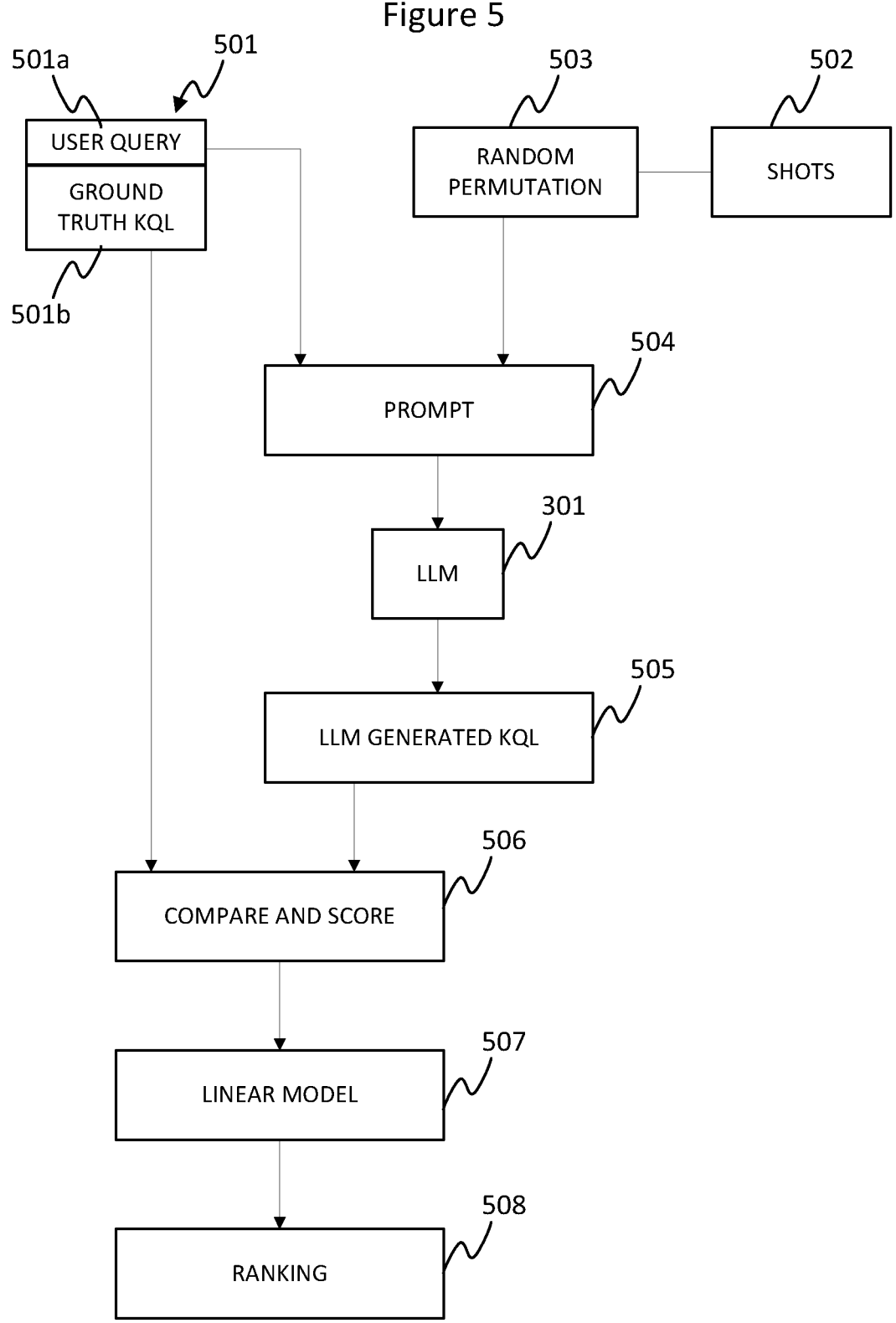
FIG. 5 is a schematic block diagram illustrating a technique for probing the large language model to generate training data for selecting shots.

FIG. 5 illustrates an example process of probing the LLM 301 using the training data set 110.

The training data 110 is split into two portions for the probing process—the first portion being a plurality of validation training data items 501, and the second being a plurality of example shots 502. The validation training items 501 each include a user query 501a and a ground truth KQL query 501b. The shots 502 likewise include user queries and corresponding ground truth KQL.

A user query 501a is selected to form the subject of a probe prompt 504. In other words, the probe prompt 504 is generated with the aim of obtaining KQL corresponding to the selected user query 501a.

The system 100 selects a random permutation of shots from the example shots 502, as represented by block 503. For example, a random subset of 4 shots may be selected, with the order also randomised. The selected shots are included in the probe prompt 504.

Subsequently, the probe prompt 504 is submitted to the LLM 301, and KQL 505 is returned by the LLM 301 corresponding to the probe prompt.

The LLM generated KQL 505 is then compared to the ground truth KQL 501b corresponding to the user query 501a. The system calculates a score that is reflective of the quality of the LLM generated KQL 505 based on the ground truth 501b, represented in FIG. 5 by block 506.

In one example, the score is a weighted score comprising a combination of metrics. For example, one metric may be an edit distance (e.g. Levenshtein distance or similar) between the LLM generated KQL 505 and the ground truth 501b. Other example metrics reflect the semantic validity of the KQL 505, and whether the correct tables are included in the KQL 505. The score may be considered a distance, with higher scores indicative of a KQL output 505 that is less reflective of the ground truth 501b and lower scores reflecting KQL output 505 closer to the ground truth 501b.

The process of generating a prompt for a given user query 501 including a random permutation of shots is repeated multiple times. For example, 100 probe prompts may be generated for a given user query.

FIG. 6 illustrates the output of this part of the process. Each row in the table of FIG. 6 represents a particular probe prompt for a given user query 501. The rightmost column of the table represents the score associated with the probe prompt. The other columns of the table reflect which example shots of the set of example shots were included in the probe prompt, with "1" indicating the shot is included and "0" indicating that the shot is not included. The table in FIG. 6 only includes 6 possible shots and 4 probe prompts for the purpose of illustration—in practice the set of shots and probe prompts is significantly larger.

Next, a linear model (507, FIG. 5) is fitted to the scored probe prompts. The linear model 507 reflects the contribution of each shot to the score—i.e. to what extent each shot influenced the score and by how much. The coefficients output by the linear model are then used to generate a ranking 508 of the shots. The ranking reflects the usefulness of each shot for generating the correct KQL 505.

This procedure is repeated for each user query 501, so as to generate a ranked list of shots associated with each query.

Returning to FIG. 3, the machine learning model 130 is then trained to select shots for inclusion in a prompt for the LLM 301, based on the ranked lists associated with the training data user queries. The shots that are selected and are included in a prompt may be referred to as the "one shot" or "few shots" (as the case may be) or "selected shots", to distinguish them from the corpus of shots 502 from which they are drawn.

Figure 7:
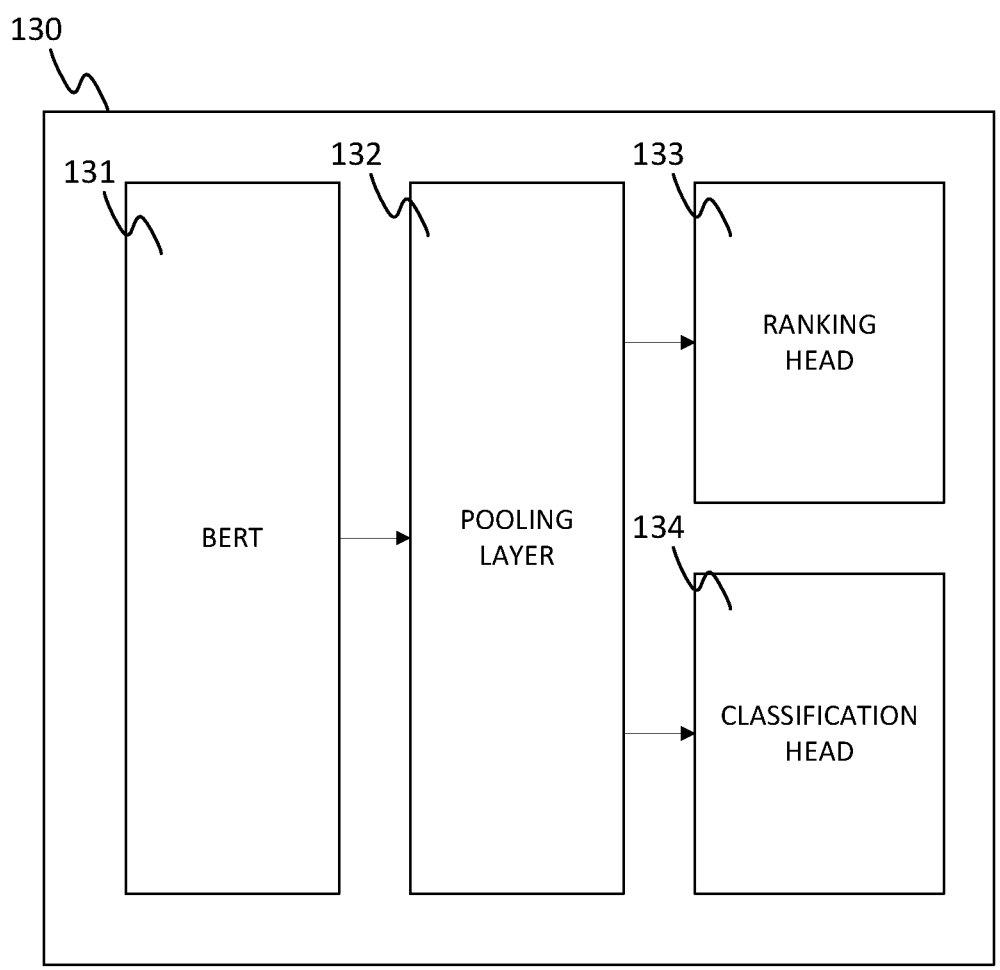
FIG. 7 is a schematic block diagram of an example machine learning model.

The structure of an example machine learning model 130 is illustrated in FIG. 7. The machine learning model 130 comprises a base pre-trained LLM 131. For example, the LLM 131 is the BERT model or a variation thereof such as the distilBERT model. The machine learning model 130 further comprises a pooling layer 132, which receives pools the output of the BERT model 131. On top of the pooling layer, the model 130 comprises two task heads: a ranking task head 133 and a classification task head 134. The ranking task head 133 is configured to determine which shots to include in a prompt, and the order of their inclusion. The classification task head 134 is configured to output the query metadata for inclusion in the prompt.

Figure 8:
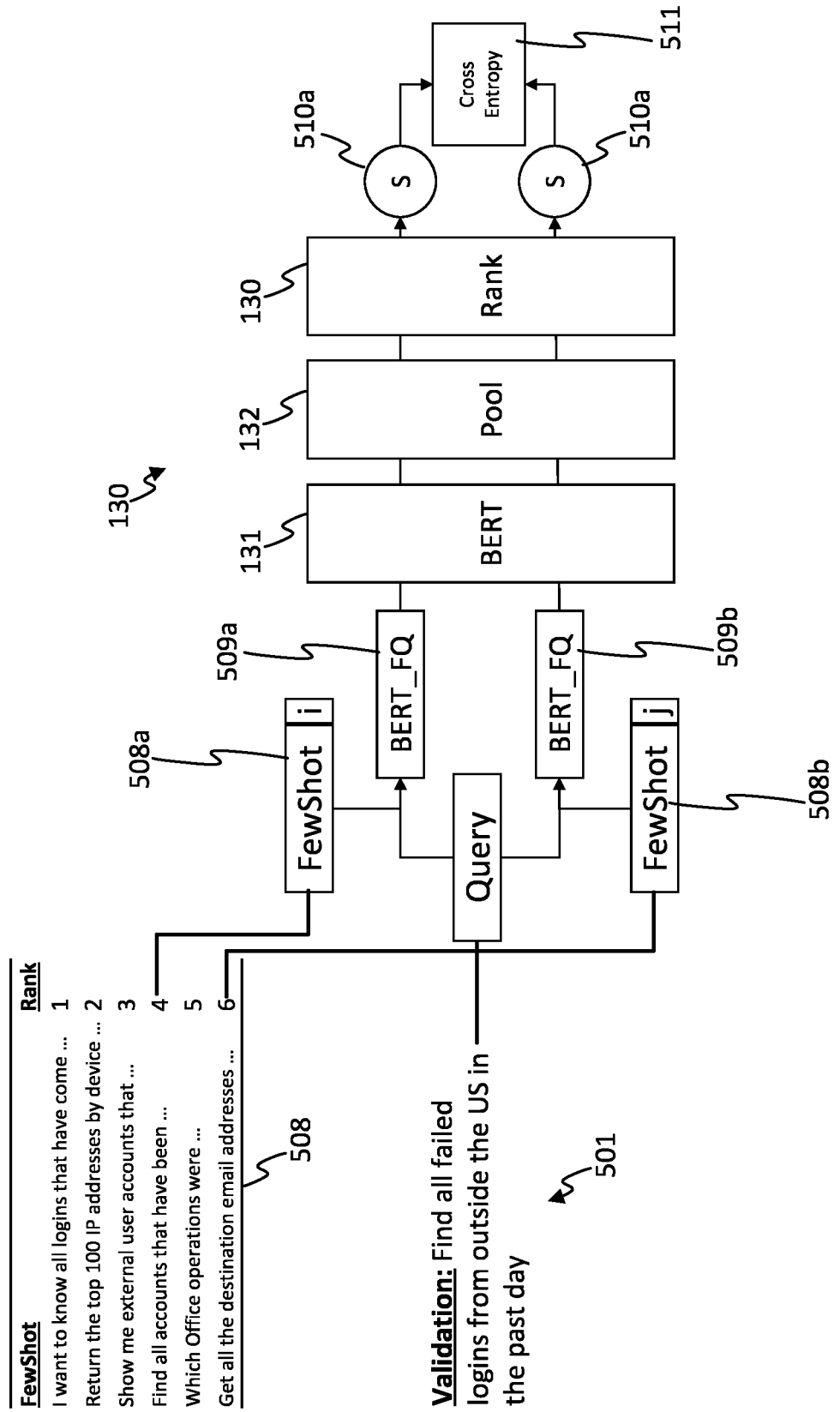
FIG. 8 is a schematic block diagram illustrating an example technique for training the machine learning model of FIG. 7 to select shots.

FIG. 8 illustrates an example process of training the machine learning model 130 to select shots.

For a given training query 501, two example shots 508a, 508b from the corresponding ranked list 508 of shots are selected. Two inputs 509a, 509b to the model 130 are generated, one from each of the selected shots 508b, 508b. In the examples using a BERT model, the input may be in the form of "[CLS] example shot [SEP] training query [SEP]".

The inputs are passed through the base LLM 131, the pooling layer 132 and ranking task head 133 to generate respective output scores 510a and 510b. A pairwise cross-entropy loss 511 is then calculated from the output scores 510a and 510b and the ground truth ranks of the shots 508a, 508b. The training of the model 130 seeks to minimise this loss function 511. In one example, the loss function 511 is a pairwise contrastive cross-entropy loss.

In more detail, calculating the cross-entropy 511 may involve passing the output scores 510a and 510b through a SoftMax layer to obtain probability values corresponding to the output scores 510a, 510. Furthermore, probability values are obtained based on the ground truth ranking 508. The two sets of probability values are compared to generate the cross entropy loss 511.

FIG. 8 illustrates the process for one pair of shots 508a, 508b for one query 501. The process is repeated for each pair of shots drawn from the ranked list of shots 508. That process is then repeated for each training query 501. As a result of the training process, the model 130 is trained to generate an output score that reflects the utility of a shot 508 for an unseen input query.

Returning once again to FIG. 3, the machine learning model 130 is then trained to generate query metadata for inclusion in a prompt using the training data.

Figure 9:
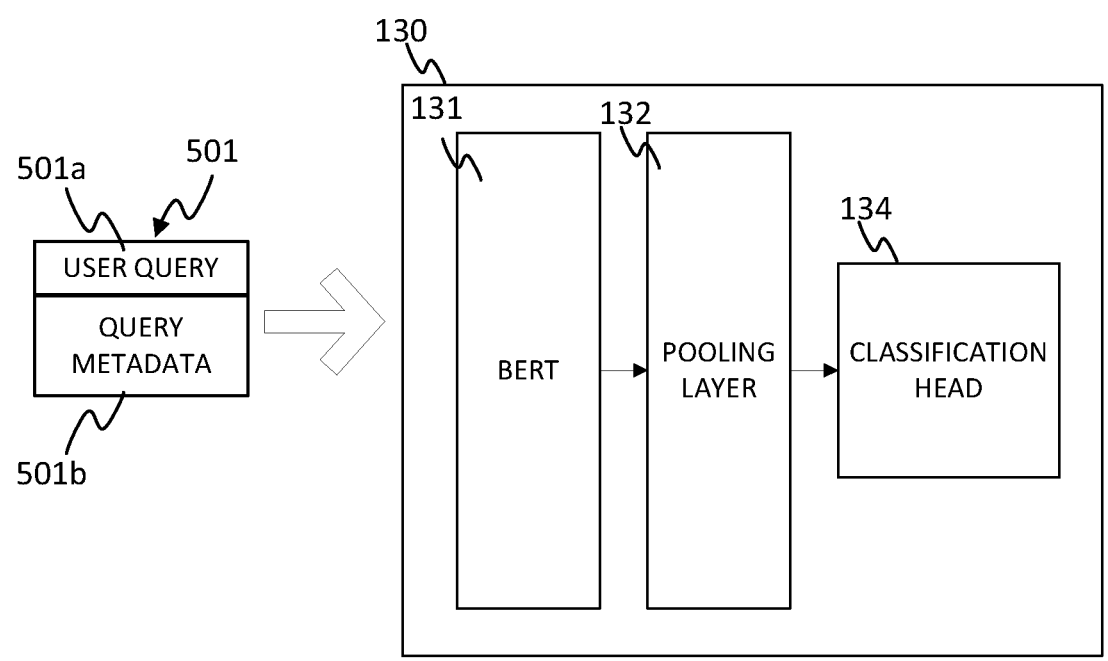
FIG. 9 is a schematic block diagram illustrating an example technique for training the machine learning model of FIG. 7 to generate query metadata.

FIG. 9 illustrates an example of the process of training the model to generate the query metadata. Particularly, the model receives input training data 501 in the form of user queries 501a with corresponding query metadata 501c. The query metadata 501c may be extracted from the ground truth KQL query 501b associated with the user query 501a. For example, the KQL query 501b may be parsed to extract a list of tables or columns included in the query, or may be evaluated to determine its length or complexity, or to determine whether the KQL query 501b includes a particular operation (e.g. "join" or "union").

The model 130 is then trained so that the classification head 134 predicts query metadata for an unseen input query. Techniques for further training BERT or other such LLM models for a particular classification task include those discussed in https://towardsdatascience.com/multilabel-classification-with-pytorch-in-5-minutes-a4a8893cbc7 and https://curiousily.com/posts/multi-label-text-classification-with-bert-and-pytorch-lightning/.

The discussion will now turn to the use of the model 130 at inference time to generate a prompt.

Figure 10:
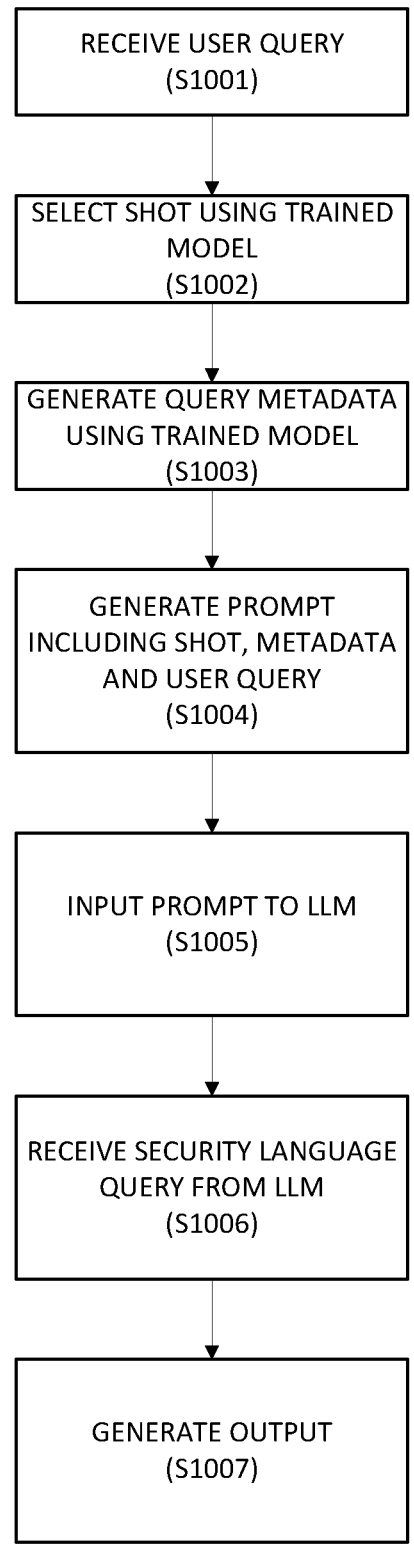
FIG. 10 is a schematic flowchart of an example method of generating a security language query from a user input query using a trained machine learning model.

FIG. 10 illustrates an example process of generating a prompt for the LLM 301 in overview. The process of FIG. 10 may be carried out by the system 200.

In step S1001, the process includes receiving an input security hunting user query. The input security hunting user query may be received via the access interface 220.

For example, the access interface 220 takes the form of a web app. In other words, the access interface 220 takes the form of a web server, configured to serve web pages. The user can provide input by viewing and interacting with the served web pages, for example using system 500. Particularly, the access interface 220 includes an input element (e.g. a text box) in which the user can enter the input security hunting user query.

In step S1002, the process includes selecting a shot using the trained machine learning model 130. Particularly, the process includes inputting the input security hunting user query to the trained model 130, and in response receiving a selected shot, for example from ranking head 133. The shot includes an example user security hunting query and corresponding example security language query. In some circumstances, a plurality of shots may be selected, as discussed below.

In step S1003, the process includes generating, using the trained machine learning model 130, query metadata from the input security hunting query. This involves inputting the input security hunting user query to the trained model 130, and in response receiving query metadata, for example from classification head 134.

In step S1004, the process includes generating a prompt for input to LLM 301. The prompt is for generating a security language query corresponding to the input security hunting user query. The prompt includes the input security hunting user query, the selected shot, and the generated query metadata. The prompt may further include static data, such as a preamble.

In step S1005, the generated prompt is input to the LLM 301. Particularly, the prompt may be submitted to the LLM 301 via a suitable API as discussed above with respect to FIG. 1.

In response, in step S1006, the process includes receiving a security language query from the LLM 301 which corresponds to the input security hunting input user query.

In step S1007, output is generated based on the generated security language query. In one example, the generated security language query is then displayed to the user, for example on the user interface 503. The user can then copy the query, and execute it on the security system 504 that they have access to. In another example, step S1007 includes executing the query in the security system 504.

Figure 11:
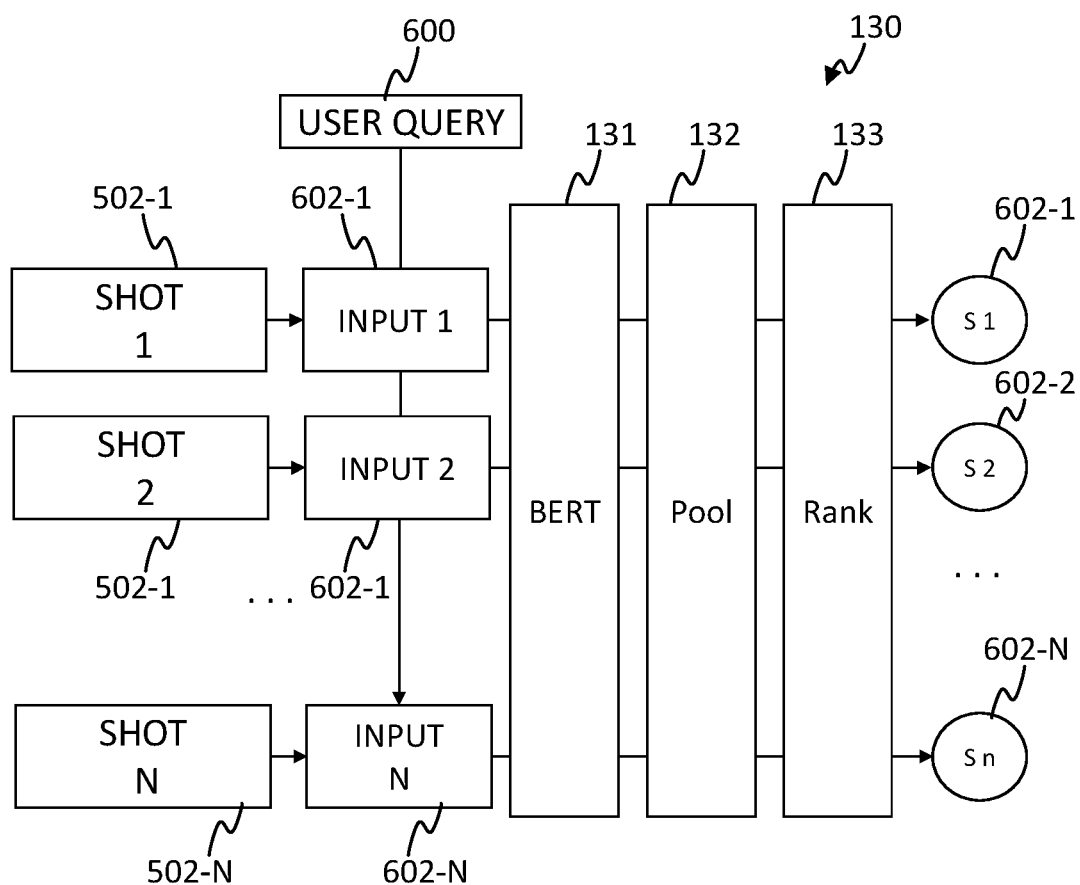
FIG. 11 is a schematic block diagram of an example technique for selecting shots.

Turning to FIG. 11, an example process of selecting shots using the trained machine learning model 130 is shown in more detail.

Each of the shots 502-1 to 502-N is combined with the user query 601 to generate respective inputs 601-1 to 601-N to the model 130. Each of the inputs 601-1 to 601-N is input to the model 130. The ranking head 133 outputs an output score 602-1 to 602-N indicating the usefulness of the respective shot 502 to the user query 601. A ranking of the usefulness of every shot 502 to the input query 601 is then obtained by ordering the shots based on the scores 602.

The ranking is then used to select the shots. In one example, the k highest scoring shots 502 are selected. k may be set in advance. For example, k is 3. In other examples, k is 1 (and thus the prompt is an example of one-shot learning by the LLM).

In other examples, the shots 502 are stochastically sampled based on the scores 602. Stochastic sampling will be discussed in more detail below.

Figure 12:
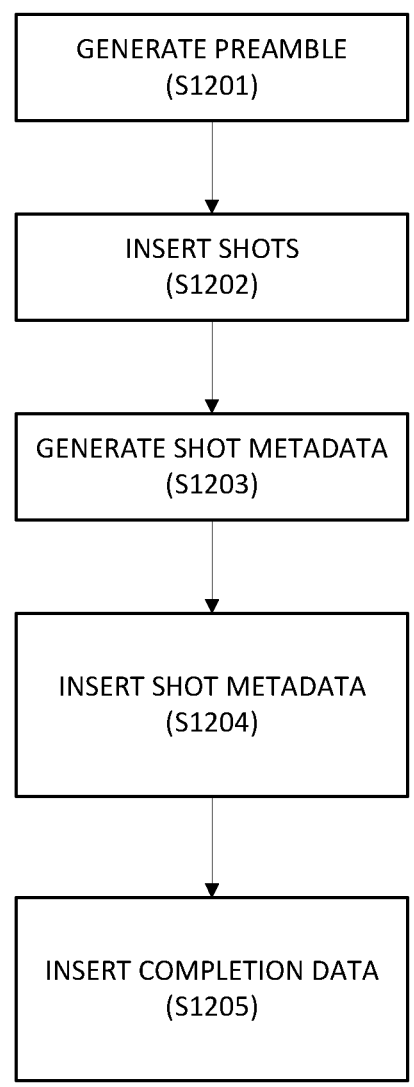
FIG. 12 is a schematic flowchart of an example process of generating a prompt.

FIG. 12 illustrates an example process of generating the prompt including the selected shots and query meta data. The process generally involves populating a template or "skeleton" prompt with shots and metadata from the trained model, along with other predetermined or statically generated information.

Firstly, in step S1201, the preamble of the prompt is generated. The preamble includes predetermined text that acts as context for the LLM 301 in order to generate the correct output. In addition, the preamble includes the query metadata in the form of table schema information.

Next, in step S1202, the selected shots 502 (e.g. selected as discussed above in relation to FIGS. 10 and 11) are inserted into the prompt. In cases where multiple shots are included, the shots can be included in a predetermined order. For example, in some circumstances it has been found that the final shot in a prompt has a greater influence on the output of the LLM 301 than earlier prompts. Accordingly, the shots 502 may be ordered so that the highest scoring shots 502 are placed last. In the event that multiple shots 502 are inserted, they may be separated by a suitable separator.

In step S1203, shot metadata corresponding to each of the selected shots 502 is generated. This shot metadata is similar to the query metadata discussed herein. However, as the KQL of each of the selected shots is already known, the shot metadata can be determined from the KQL itself. For example, the KQL in the shot 502 can be parsed to extract the tables and columns used. The KQL can likewise be processed to provide a measure of the complexity or length of the query.

In step S1204, the shot metadata is inserted into the prompt.

In step S1205, final information is generated and inserted into the prompt. The final information is the final part of the prompt. The final information includes query metadata in the form of table intent information. The final information also includes the user query. The completed prompt takes the form of a text data (i.e. a string).

Figure 13:
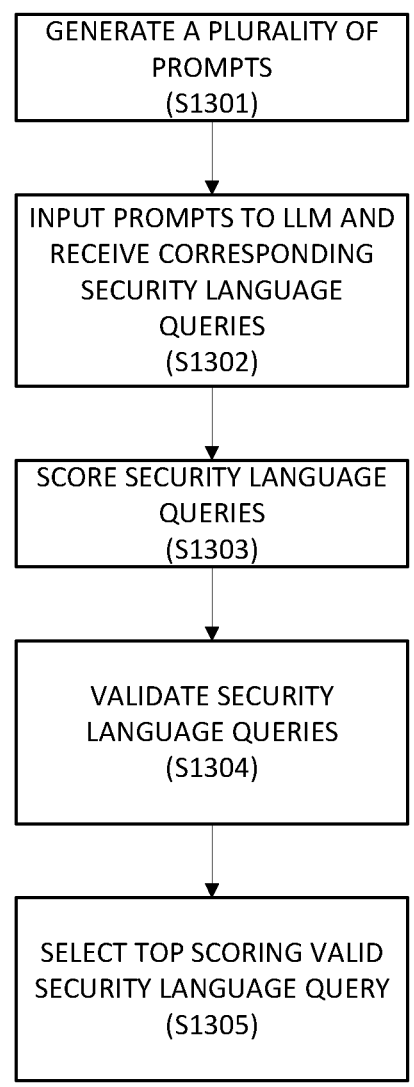
FIG. 13 is schematic flowchart of an example process of generating a plurality of prompts.

FIG. 13 illustrates a process in accordance with another example of the disclosure.

In step S1301, a plurality of prompts are generated for a given input query. The plurality of prompts differ from one another. For example, the prompts may include different selections of shots, or different query metadata. Accordingly, generating each prompt may include selecting the respective shots and generating the query metadata.

This may be accomplished by stochastically sampling the output of the model 130, or altering parameters or settings associated with the trained model 130 to introduce variability into the output of the model 130.

In some examples, step S1301 includes co-ordinating the generation of the plurality of prompts, so as to effectively obtain a spread of prompts having some spread or distribution of different shots or query metadata. Co-ordinating the generation of the plurality of prompts in this manner may increase the chances of the LLM 301 returning a valid KQL query that closely reflects the user's intent.

Figure 14:
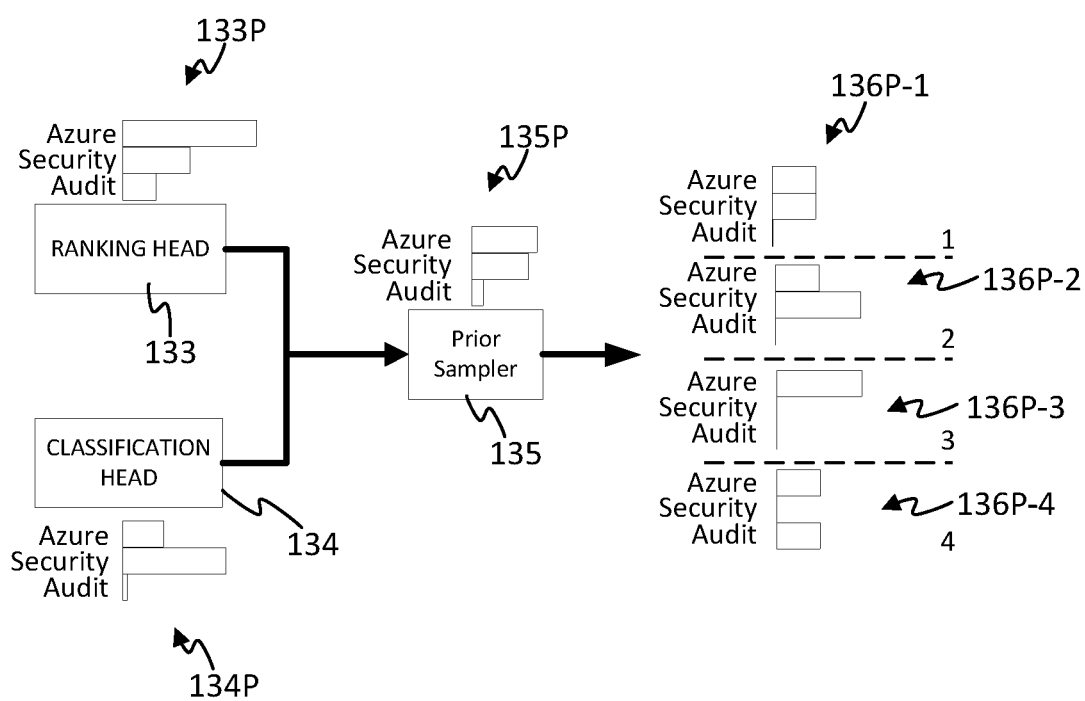
FIG. 14 is a schematic block diagram illustrating an example technique for co-ordinating the generation of the plurality of prompts.

FIG. 14 illustrates an example technique for co-ordinating the generation of the plurality of prompts. In FIG. 14, the ranking head 133 and classification head 134 each have a corresponding prior probability distribution 133P, 134P. The prior distributions 133P, 134P shown reflect the distribution of the topics of the user queries—in this case whether they relate to a particular product. In other examples, the distributions may reflect the intent in the user queries—i.e. the table names or schema data, or whether particular operations (join or union) are included.

In this example, the model 130 further includes a prior sampler 135, which combines the prior distributions 133P, 134P from the heads into a central prior distribution 135P. The prior sampler 135 then samples the central prior distribution to output a plurality of prior distributions 136P-1 to 136P-4. For example, a truncated discrete sampling step can be used to generate the differing distributions 136P.

The sampled distributions 136P-1 to 136P-4 are then each used as parameters for the ranking head 133 and classification head 134, in order to generate the relevant output (i.e. the shot selection or query metadata). In the example shown, 4 distributions would be used to generate 4 prompts, but it will be understood that the number of different prompts generated may be varied. In one example, 10 prompts are generated.

Returning to FIG. 13, in step S1302 the plurality of generated prompts are each passed to the LLM 301, and corresponding KQL query is returned.

Next, in step S1303 the KQL queries are scored. The score reflects the likelihood that the KQL query corresponds to the input user security hunting query. In one example, the score is based on a probability or confidence returned by the LLM 301. For example, the probability returned by the LLM 301 is weighted using the prior sampled probabilities to generate the score.

Next, in step S1304, the KQL queries returned by the LLM 301 are validated. In other words, the KQL queries are parsed to ensure that they are syntactically valid. In step S1305, the top scoring valid query is selected as the KQL query that corresponds to the user input.

Figure 15:
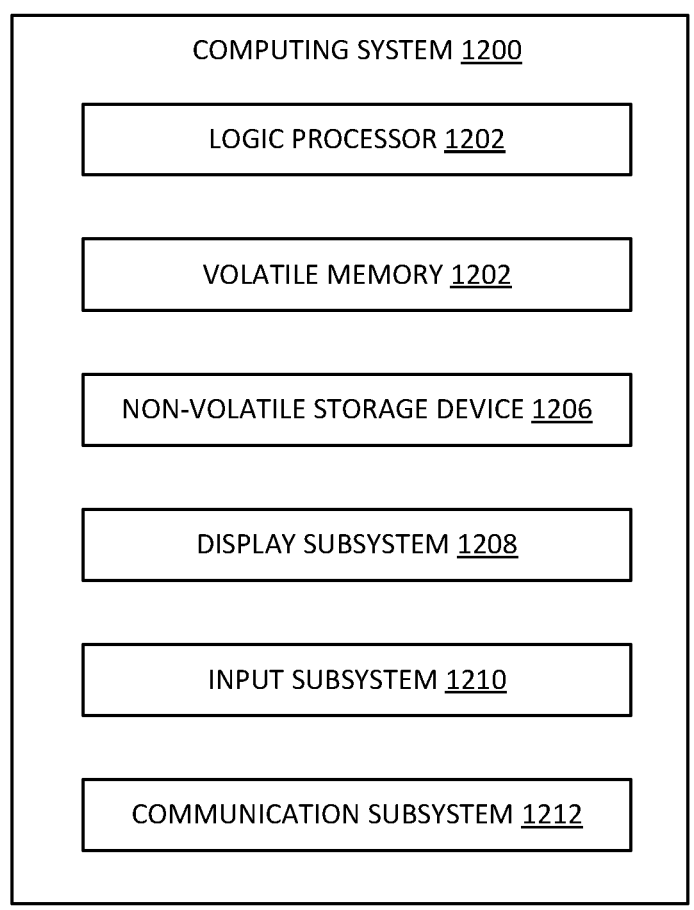
FIG. 15 is a schematic view of an example computing system.

FIG. 15 schematically shows a non-limiting example of a computing system 1200 that can enact one or more of the methods and processes described above. Computing system 1200 is shown in simplified form. Computing system 1200 may embody any of the computing systems 100, 200, 300 or 500 described above and illustrated in FIG. 1. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e.g., CD, DVD, HD-DVD, Blu-Ray Disc, etc), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the internet. Various modifications may be made to the examples discussed herein within the scope of the disclosure.

Throughout the disclosure, reference is made to KQL as an example security query language. KQL is merely an example of such a security query language, and the techniques disclosed herein can be applied to other query languages such as those used in Splunk and Google security products.

The probing technique discussed herein for assessing the impact of shots on the output KQL can also be applied to probe other aspects of the LLM 301. For example, probe prompts can be generated to assess the impact that particular hyperparameters or model settings have on the output KQL. For example, a regression head may be added to the model 130, which is trained based on the outcome of probe prompts in which hyperparameters of the model are randomly selected.

The examples herein make use of a single underlying pretrained model with multiple heads to respectively carry out shot selection and query metadata generation. In other examples, however, separate underlying pretrained models may be employed for these purposes. In such examples, the combination of models can be considered a "trained model" as defined herein.

The particular training data set discussed herein is an example and may be varied. The techniques employed to synthesise the training data may be employed in a different order—for example the backtranslation may take place after augmentation.

Whilst the examples described herein relate to user input queries that are in the form of natural language (i.e. utterances), the user input queries are not limited to this form. In some examples, the input queries can include structured data. For example, the input queries may include graphs illustrating relations between entities, or tabular data.

The measures of "distance" or similarity in the probing process are examples—any suitable method of assessing the correspondence between the ground truth query and the result returned by the LLM 301 during probing may be employed. Likewise, the use of a linear model to rank the impact the shots have on a particular user query is an example and another suitable model may be employed.

At inference time, the order of the steps discussed herein may be varied. For example, a prompt template may be created and the query metadata generated and shots selected subsequently. Similarly, in the examples involving generating a plurality of KQL queries, the KQL queries may be validated before being scored.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage (e.g. storage 102 and 202) for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

Additional example features of the disclosure are set out below.

The below features are defined in relation to the first aspect listed in the summary.

The input security hunting user query may be a natural language query.

The query metadata may comprise table schema data indicating tables or columns relevant to the security language query.

The method may further comprise: generating example metadata from the selected example security language query, wherein the prompt further comprises the example metadata.

The prompt may further comprise a preamble indicating that the large language model should return an input security hunting query corresponding to the input security hunting user query.

The method may comprise: selecting a plurality of example user security hunting queries and corresponding example security language queries, the prompt comprising the selected plurality of example user security hunting queries.

The method may comprise storing a set of example user security hunting queries and corresponding example security language queries; generating, using the trained machine learning model, a score indicative of the relevance of each example user security hunting query and corresponding example security language query in the set to the input user security hunting query; selecting the plurality of example security hunting queries and corresponding example security language queries from the set based on the scores.

The method may comprise: generating a plurality of prompts, each prompt including a different combination of selected example user security hunting query and corresponding example security language query and generated query metadata; inputting each of the plurality of prompts to the large language model; receiving a security language query from the large language model corresponding to each of the plurality of prompts; scoring each security language query; selecting a top scoring security language query.

The method may comprise: sampling a prior probability distribution of the trained machine learning model to generate a sampled prior probability distribution for each prompt of the plurality of prompts; and selecting the example user security hunting query and corresponding example security language query and generating the query metadata for each prompt based on the sampled prior probability distribution.

The below features are defined in relation to the second aspect listed in the summary.

The trained model may comprise: a base large language model; a pooling layer; a ranking head; and a classification head. The ranking head may be trained to select the user security hunting query and corresponding ground truth security language query. The classification head may be trained to generate the query metadata.

The method may comprise generating the training data set by: receiving an initial training data set comprising a plurality of user security hunting queries, corresponding ground truth security language queries and corresponding query metadata; receiving a security query set comprising security language queries and corresponding textual descriptions of the security language queries; generating a prompt including: a user security hunting query and corresponding ground truth security language query drawn from the initial training data set and a security language query and corresponding textual description from the security query set; inputting the prompt to a natural language generation large language model; receiving a user security hunting query correspond to the security language query from the security query set, including the received user security hunting query and the security language query from the security query set in the training data set.

The method may comprise: backtranslating the user security hunting queries to generate backtranslated security hunting queries; and including the backtranslated security hunting queries in the training data set.

The method may comprise: fitting a model to the probe scores; generating, from the fitted model, a ranking indicative of a usefulness of each example included in the probe prompts to the subject of the probe prompt; training the machine learning model to select a user security hunting query and corresponding ground truth security language query of the training data set based on the ranking.

Training the machine learning model based on the ranking may comprise: selecting a pair of examples from the ranking; inputting the pair of examples to the machine learning model; training the model to minimise a pairwise cross-entropy loss calculated from the pair of examples.

The method may comprise: generating a plurality of hyperparameter probe prompts, wherein generating each hyperparameter probe prompt comprises: selecting one of the plurality of user security hunting queries as a subject of the hyperparameter probe prompt; randomly selecting values for a hyperparameter of the machine learning model; inputting the generated hyperparameter probe prompts to the large language model; receiving as output from the large language model, a security language query corresponding to the subject of each hyperparameter probe prompt; comparing the received security language query for the hyperparameter probe prompt to the corresponding ground truth security language query; calculating a hyperparameter probe score for each hyperparameter probe prompt based on the comparison; training the machine learning model to select a value for the hyperparameter based on the calculated hyperparameter probe scores.

The methods of the aspects discussed in the summary may be combined. The trained model used in the first aspect may be trained according to the method of the second aspect Another example computer-implemented method provided by the disclosures comprises: The disclosure extends to a system comprising a processor and a storage, the storage storing computer-readable instructions, which when executed by the processor, carry out any of the methods described herein.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer-implemented method comprising:
receiving a training data set comprising a plurality of user security hunting queries, corresponding ground truth security language queries, and corresponding query metadata;
generating a plurality of probe prompts from the training data set, wherein generating each probe prompt comprises:
selecting one of the plurality of user security hunting queries as a subject of the probe prompt, and
randomly selecting a subset of the plurality of user security hunting queries and corresponding ground truth security language queries as examples for inclusion into the probe prompt;
inputting the probe prompts to a large language model;
receiving, as output from the large language model, security language queries corresponding to the subjects of the probe prompts;
comparing the security language queries for the probe prompts to the corresponding ground truth security language queries;
calculating probe scores for the probe prompts based on the comparison; and
training a machine learning model based on the calculated probe scores and the training data set, the machine learning model being trained to:
receive an input user security hunting user query,
generate output scores reflective of a utility of the user security hunting queries and corresponding ground truth security language queries of the training data set to the input user security hunting user query, and
select a user security hunting query and corresponding ground truth security language query of the training data set as an example for inclusion into a prompt for input to the large language model based on the output scores, and
generate query metadata for inclusion into the prompt for input to the large language model from the input security hunting user query.

2. The method of claim 1, wherein the trained model comprises:
a base large language model;
a pooling layer;
a ranking head; and
a classification head,
wherein the ranking head is trained to select the user security hunting query and corresponding ground truth security language query, and the classification head is trained to generate the query metadata.

3. The method of claim 1, comprising generating the training data set by:
receiving an initial training data set comprising a plurality of user security hunting queries, corresponding ground truth security language queries, and corresponding query metadata;
receiving a security query set comprising security language queries and corresponding textual descriptions of the security language queries;
generating a prompt including:
a user security hunting query and corresponding ground truth security language query drawn from the initial training data set, and
a security language query and corresponding textual description from the security query set;
inputting the prompt to a natural language generation large language model;
receiving, as output from the natural language generation large language model, a user security hunting query corresponding to the security language query from the security query set,
including the received user security hunting query and the security language query from the security query set in the training data set.

4. The method of claim 1, comprising:
backtranslating the user security hunting queries to generate backtranslated security hunting queries; and
including the backtranslated security hunting queries in the training data set.

5. The method of claim 1, comprising:
fitting a linear model to the probe scores;
generating, from the linear model, rankings indicative of usefulness of the examples included in the probe prompts to the subjects of the probe prompts;
wherein training the machine learning model to generate the output scores to select a user security hunting query and corresponding ground truth security language query of the training data set is based on the ranking.

6. The method of claim 5, wherein training the machine learning model based on the ranking comprises:
selecting a pair of examples from the ranking;
inputting the pair of examples to the machine learning model;
training the machine learning model to minimize a pairwise cross-entropy loss calculated from the pair of examples.

7. The method of claim 1, comprising:
generating a plurality of hyperparameter probe prompts, wherein generating each hyperparameter probe prompt comprises:
selecting one of the plurality of user security hunting queries as a subject of the hyperparameter probe prompt, and
randomly selecting values for a hyperparameter of the machine learning model;
inputting the generated hyperparameter probe prompts to the large language model;
receiving, as output from the large language model, security language queries corresponding to the subjects of the hyperparameter probe prompt;
comparing the received security language queries for the hyperparameter probe prompts to the corresponding ground truth security language queries;
calculating hyperparameter probe scores for the hyperparameter probe prompts based on the comparison; and
training the machine learning model to select a value for the hyperparameter based on the calculated hyperparameter probe scores.

8. A system comprising a processor and a storage, the storage storing computer-readable instructions which, when executed by the processor, cause the system to perform operations comprising:
receiving a training data set comprising a plurality of user security hunting queries, corresponding ground truth security language queries, and corresponding query metadata;
generating a plurality of probe prompts from the training data set, wherein generating each probe prompt comprises:
selecting one of the plurality of user security hunting queries as a subject of the probe prompt, and
randomly selecting a subset of the plurality of user security hunting queries and corresponding ground truth security language queries as examples for inclusion into the probe prompt;
inputting the probe prompts to a large language model;
receiving, as output from the large language model, security language queries corresponding to the subjects of the probe prompts;
comparing the security language queries for the probe prompts to the corresponding ground truth security language queries;
calculating probe scores for the probe prompts based on the comparison; and
training a machine learning model based on the calculated probe scores and the training data set, the machine learning model being trained to:
receive an input user security hunting user query,
generate output scores reflective of a utility of the user security hunting queries and corresponding ground truth security language queries of the training data set to the input user security hunting user query, and
select a user security hunting query and corresponding ground truth security language query of the training data set as an example for inclusion into a prompt for input to the large language model based on the output scores, and generate query metadata for inclusion into the prompt for input to the large language model from the input security hunting user query.

9. The system of claim 8, wherein the trained model comprises:
a base large language model;
a pooling layer;
a ranking head; and
a classification head,
wherein the ranking head is trained to select the user security hunting query and corresponding ground truth security language query, and the classification head is trained to generate the query metadata.

10. The system of claim 8, the operations further comprising generating the training data set by:
receiving an initial training data set comprising a plurality of user security hunting queries, corresponding ground truth security language queries, and corresponding query metadata;
receiving a security query set comprising security language queries and corresponding textual descriptions of the security language queries;
generating a prompt including:
a user security hunting query and corresponding ground truth security language query drawn from the initial training data set, and
a security language query and corresponding textual description from the security query set;
inputting the prompt to a natural language generation large language model;
receiving, as output from the natural language generation large language model, a user security hunting query corresponding to the security language query from the security query set,
including the received user security hunting query and the security language query from the security query set in the training data set.

11. The system of claim 8, the operations further comprising:
backtranslating the user security hunting queries to generate backtranslated security hunting queries; and
including the backtranslated security hunting queries in the training data set.

12. The system of claim 8, the operations further comprising:
fitting a linear model to the probe scores;
generating, from the linear model, rankings indicative of usefulness of the examples included in the probe prompts to the subjects of the probe prompts;
wherein training the machine learning model to generate the output scores to select a user security hunting query and corresponding ground truth security language query of the training data set is based on the ranking.

13. The system of claim 12, wherein training the machine learning model based on the ranking comprises:
selecting a pair of examples from the ranking;
inputting the pair of examples to the machine learning model;
training the machine learning model to minimize a pairwise cross-entropy loss calculated from the pair of examples.

14. The system of claim 8, the operations further comprising:
generating a plurality of hyperparameter probe prompts, wherein generating each hyperparameter probe prompt comprises:
selecting one of the plurality of user security hunting queries as a subject of the hyperparameter probe prompt, and randomly selecting values for a hyperparameter of the machine learning model;

inputting the generated hyperparameter probe prompts to the large language model;

receiving, as output from the large language model, security language queries corresponding to the subjects of the hyperparameter probe prompt;

comparing the received security language queries for the hyperparameter probe prompts to the corresponding ground truth security language queries;

calculating hyperparameter probe scores for the hyperparameter probe prompts based on the comparison; and training the machine learning model to select a value for the hyperparameter based on the calculated hyperparameter probe scores.

15. A non-transitory computer-readable storage medium storing computer-readable instructions which, when executed by a processor, cause the processor to perform operations comprising:

receiving a training data set comprising a plurality of usersecurity hunting queries, corresponding ground truth security language queries, and corresponding query metadata;

generating a plurality of probe prompts from the training data set, wherein generating each probe prompt comprises:
  selecting one of the plurality of user security hunting queries as a subject of the probe prompt, and
  randomly selecting a subset of the plurality of user security hunting queries and corresponding ground truth security language queries as examples for inclusion into the probe prompt;

inputting the probe prompts to a large language model;

receiving, as output from the large language model, security language queries corresponding to the subjects of the probe prompts;

comparing the security language queries for the probe prompts to the corresponding ground truth security language queries;

calculating probe scores for the probe prompts based on the comparison; and training a machine learning model based on the calculated probe scores and the training data set, the machine learning model being trained to:
  receive an input user security hunting user query,
  generate output scores reflective of a utility of the user security hunting queries and corresponding ground truth security language queries of the training data set to the input usersecurity hunting user query, and
  select a user security hunting query and corresponding ground truth security language query of the training data set as an example for inclusion into a prompt for input to the large language model based on the output scores, and generate query metadata for inclusion into the prompt for input to the large language model from the input security hunting user query.

16. The non-transitory computer-readable storage medium of claim 15, wherein the trained model comprises:
a base large language model;
a pooling layer;
a ranking head; and
a classification head,
wherein the ranking head is trained to select the user security hunting query and corresponding ground truth security language query, and the classification head is trained to generate the query metadata.

17. The non-transitory computer-readable storage medium of claim 15, the operations further comprising generating the training data set by:
receiving an initial training data set comprising a plurality of user security hunting queries, corresponding ground truth security language queries, and corresponding query metadata;
receiving a security query set comprising security language queries and corresponding textual descriptions of the security language queries;
generating a prompt including:
  a user security hunting query and corresponding ground truth security language query drawn from the initial training data set, and
  a security language query and corresponding textual description from the security query set;
inputting the prompt to a natural language generation large language model;
receiving, as output from the natural language generation large language model, a user security hunting query corresponding to the security language query from the security query set,
including the received user security hunting query and the security language query from the security query set in the training data set.

18. The non-transitory computer-readable storage medium of claim 15, the operations further comprising:
backtranslating the user security hunting queries to generate backtranslated security hunting queries; and
including the backtranslated security hunting queries in the training data set.

19. The non-transitory computer-readable storage medium of claim 15, the operations further comprising:
fitting a linear model to the probe scores;
generating, from the linear model, rankings indicative of usefulness of the examples included in the probe prompts to the subjects of the probe prompts;
wherein training the machine learning model to generate the output scores to select a user security hunting query and corresponding ground truth security language query of the training data set is based on the ranking.

20. The non-transitory computer-readable storage medium of claim 19, wherein training the machine learning model based on the ranking comprises:
selecting a pair of examples from the ranking;
inputting the pair of examples to the machine learning model;
training the machine learning model to minimize a pairwise cross-entropy loss calculated from the pair of examples.

* * * * *